(12) United States Patent
Lachaize

(10) Patent No.: US 10,843,647 B2
(45) Date of Patent: Nov. 24, 2020

(54) METHOD FOR DETERMINING A CELL CURRENT LIMIT OF A TRACTION BATTERY AND AN ONBOARD NETWORK IN A MOTOR VEHICLE

(71) Applicants: Continental Automotive France, Toulouse (FR); Continental Automotive GmbH, Hannover (DE)

(72) Inventor: Jérôme Lachaize, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/489,130

(22) PCT Filed: Apr. 9, 2018

(86) PCT No.: PCT/FR2018/050880
§ 371 (c)(1),
(2) Date: Aug. 27, 2019

(87) PCT Pub. No.: WO2018/193183
PCT Pub. Date: Oct. 25, 2018

(65) Prior Publication Data
US 2019/0389410 A1    Dec. 26, 2019

(30) Foreign Application Priority Data

Apr. 18, 2017   (FR) ..................................... 17 53340

(51) Int. Cl.
*B60R 16/033*   (2006.01)
*B60L 58/10*   (2019.01)
(Continued)

(52) U.S. Cl.
CPC .............. *B60R 16/033* (2013.01); *B60L 1/00* (2013.01); *B60L 58/10* (2019.02); *H02J 7/0029* (2013.01);
(Continued)

(58) Field of Classification Search
CPC .... B60R 16/033; B60R 16/03; H02J 2310/46; H02J 7/0029; H02J 7/0021;
(Continued)

(56) References Cited

U.S. PATENT DOCUMENTS

| 6,992,452 B1* | 1/2006 | Sachs ..................... H02P 29/032 318/434 |
| 2011/0217608 A1* | 9/2011 | Matsumoto ......... H01M 8/0432 429/428 |

(Continued)

FOREIGN PATENT DOCUMENTS

| DE | 102013224401 A1 | 6/2014 |
| DE | 102014201360 A1 | 7/2015 |
| DE | 102014223971 A1 | 5/2016 |

OTHER PUBLICATIONS

English Translation of the Written Opinion for International Application No. PCT/FR2018/050880, dated Jul. 13, 2018, 7 pages.
(Continued)

*Primary Examiner* — Carlos Amaya
*Assistant Examiner* — Esayas G Yeshaw
(74) *Attorney, Agent, or Firm* — RatnerPrestia

(57) ABSTRACT

A method for determining a cell current limit for a traction battery and for an onboard network that is supplied with power by the traction battery in a motor vehicle with, respectively, a cell and onboard network voltage limiter using an integral feedback loop calculating a respective integral current term. The integral feedback loops of the two voltage limiters are interdependent, the integral current
(Continued)

terms of the cell voltage limiter being transmitted to the integral feedback loop of the network voltage limiter and the integral terms of the voltage limiter of the network being transmitted to the integral feedback loop of the cell voltage limiter so as to determine a battery current limit that is common to the two limiters.

14 Claims, 3 Drawing Sheets

(51) Int. Cl.
  *B60L 1/00* (2006.01)
  *H02J 7/00* (2006.01)
(52) U.S. Cl.
  CPC ....... *H02J 7/0063* (2013.01); *B60L 2240/547* (2013.01); *B60L 2240/549* (2013.01); *H02J 7/00304* (2020.01)
(58) Field of Classification Search
  CPC .. H02J 2310/48; H02J 7/0063; H02J 7/00304; B60L 1/00; B60L 58/10; B60L 58/21; B60L 2240/547; B60L 2240/549; Y02T 10/7061; Y02T 10/7011; G05F 1/46
  See application file for complete search history.

(56) References Cited

U.S. PATENT DOCUMENTS

| | | |
|---|---|---|
| 2014/0145650 A1 | 5/2014 | Li et al. |
| 2014/0167712 A1 | 6/2014 | Kim et al. |
| 2017/0203654 A1* | 7/2017 | He .................. H01M 10/0525 |
| 2017/0259686 A1* | 9/2017 | Lee ........................ B60L 58/21 |
| 2017/0264136 A1 | 9/2017 | Schindler et al. |
| 2018/0050597 A1* | 2/2018 | Hand, III ................ H02J 7/008 |
| 2019/0359066 A1* | 11/2019 | Duan .................... H02J 7/0029 |

OTHER PUBLICATIONS

International Search Report and Written Opinion for International Application No. PCT/FR2018/050880, dated Jul. 13, 2018—8 pages.

* cited by examiner

METHOD FOR DETERMINING A CELL CURRENT LIMIT OF A TRACTION BATTERY AND AN ONBOARD NETWORK IN A MOTOR VEHICLE

CROSS REFERENCE TO RELATED APPLICATIONS

This application is the U.S. National Phase Application of PCT International Application No. PCT/FR2018/050880, filed Apr. 9, 2018, which claims priority to French Patent Application No. 1753340, filed Apr. 18, 2017, the contents of such applications being incorporated by reference herein.

FIELD OF THE INVENTION

The present invention relates to a method for determining a cell current limit for a traction battery and for an onboard network that is supplied with power by the traction battery in an electric or hybrid motor vehicle.

SUMMARY OF THE INVENTION

It is determined with, respectively, a cell voltage limiter and an onboard network voltage limiter. The cell voltage limiter receives, for each cell, a predetermined cell voltage limit and an actual cell voltage and the onboard network limiter receives a predetermined network voltage limit and an actual onboard network voltage. Each limiter comprises an integral feedback loop calculating a respective integral current term on the basis of the difference between the voltage limit and the actual voltage that are received by the limiter.

FIG. 1 illustrates an electric motor vehicle comprising a traction battery 1. The thick black lines represent the traction network 3 while the thinner black lines represent the onboard network 2.

The vehicle includes an electric traction motor 4 for driving the vehicle and an inverter 5, which may be inserted between the electric traction motor 4 and the traction battery 1 in the traction network 3. The traction network 3 may supply power to auxiliary elements 9, such as an air-conditioning or heating system, an air compressor, etc. The traction network 3 also comprises a charging connector 10 for the traction battery 1 which is connected to a charging point external to the motor vehicle. A controller area network (CAN) 11 connects multiple intercommunicating computers to one and the same cable.

The electric traction motor 4 requires a high-voltage power supply while the onboard network requires a generally low- or medium-voltage power supply. The traction battery 1 therefore supplies the onboard network 2 with power by first going through a voltage step-down DC-to-DC transformer 6. Specifically, the voltage of the traction battery may be between 48 and 400 volts while the voltage of the onboard network may be between 12 and 24 volts. However, this is not limiting.

In the onboard network 2, equipment such as computers, including that of an electronic control unit (ECU) 7, which is on board the motor vehicle for controlling or monitoring various control members, are connected. The electronic control unit 7 may contain for example a vehicle supervisor, which manages in particular a battery management system for limiting the voltage in the onboard network 2 if this voltage exceeds a predetermined limit.

The onboard network 2 also comprises multimedia equipment such as a car radio, various electric actuators such as those for the wipers, the window lifts, etc., light sources and a low voltage battery 8, for example a 12-volt battery for an onboard network 2 at this voltage.

Every electric or hybrid motor vehicle is fitted both with a battery management system that manages the traction battery and with a vehicle supervisor that manages the control of the battery management system in an onboard network.

Since the battery comprises a plurality of cells, the battery management system or battery-regulating system implements a method for limiting the voltage of each cell of the battery between 2 and 4.2 volts, in particular for a lithium-ion battery, if it is observed to be too high or too low. Specifically, a traction battery, often a lithium-ion battery, should not be discharged below 2 volts per cell, corresponding to a deep discharge of the cell, which may be damaging for the cell and irreversibly affect the life of the battery.

The older cells get, the further they diverge from one another, in particular with regard to their voltage. Some cells exhibit high voltages, while others exhibit low voltages. It is then possible to group cells together in order to rebalance them. It is also possible to add a balancing system.

For its part, the vehicle supervisor implements a method that limits the voltage of the onboard network if an excess or shortfall is observed. Therefore, the voltage is controlled for each cell of the battery and the voltage is controlled for the onboard network. This takes place either in an open loop or in a closed loop. A cell voltage limiter is incorporated within the battery management system and an onboard network voltage limiter is incorporated within the motor vehicle supervisor. These voltage limiters therefore act on two joint state variables.

However, the voltage control for each cell and the voltage control for the onboard network may diverge since the adjustments for the voltage dynamics are different.

A problem arises when both voltage control commands occur at the same time. It is then difficult to guarantee stability of control. Moreover, it becomes difficult to calibrate the cell voltage limiter and the onboard network voltage limiter.

FIG. 2 shows a solution for managing the voltage of the traction battery according to the prior art. In this FIG. 2, the battery management system bears the reference 12 and the vehicle supervisor bears the reference 13. The supervisor 13 comprises the onboard network voltage limiter, bearing the reference 15, which delivers an onboard network current limit value Lim I RB, the onboard network voltage limiter 15 receiving the value of an onboard network voltage VRB.

The battery management system 12 comprises a cell voltage limiter 14 for a traction battery that delivers a cell current limit value Lim I C, the cell voltage limiter 14 receiving the value of a cell voltage VC.

The prior art uses a comparison module 23 between the values Lim I C and Lim I RB to determine the minimum value out of these two current limits, which value is taken as the battery current limit Lim I. It follows that it is one of these two values which is taken as a reference and that there is therefore no intermediate current limit value which could be better suited to the two substantially different control modes.

As such, the problem on which an aspect of the present invention is based is that of obtaining common stability and calibration for the battery current limit for the cells of the battery and for the onboard network in the event of both battery cell and onboard network voltage limiters acting at the same time.

To this end, an aspect of the invention relates to a method for determining a common battery current limit on the basis of a cell current limit for a traction battery and for an onboard network that is supplied with power by the traction battery in an electric or hybrid motor vehicle with, respectively, a cell voltage limiter and an onboard network voltage limiter, the cell limiter receiving, for each cell, a predetermined cell voltage limit and an actual cell voltage and the onboard network limiter receiving a predetermined network voltage limit and an actual onboard network voltage, each limiter comprising a respective integral feedback loop calculating, for a loop n being the $n^{th}$ loop, a respective integral current term on the basis of the difference between the voltage limit and the actual voltage that are received by the limiter, noteworthy in that the integral feedback loops of the two voltage limiters are interdependent, the integral current terms of the cell voltage limiter being transmitted to the integral feedback loop of the voltage limiter of the network and the integral terms of the voltage limiter of the network being transmitted to the integral feedback loop of the cell voltage limiter so as to determine a common battery current limit common to the two voltage limiters.

The technical effect is that of reconciling the control commands from a cell voltage limiter and an onboard network voltage limiter for a traction battery, the current limits from these voltage limiters being unalike in that they meet different requirements, which may in particular be in opposition to one another. An interdependency between the two voltage limiters makes it possible to reconcile these opposing requirements and to determine a current limit that is acceptable to these two voltage limiters when their control commands take place at the same time.

The method according to an aspect of the invention is therefore based on an interlinked implementation of the cell voltage limiter and the onboard network voltage limiter. This structure allows the integral terms of each controller to be interlinked. Because of this, in each sampling interval, the new values of the integral terms are based on the preceding integral terms of the cell voltage limiter and of the onboard network voltage limiter.

The implementation of this method makes it possible to manage the effect of each control system on the other and thereby to guarantee better stability of the method and decoupling of calibration.

Advantageously, to determine a current limit for each of the two voltage limiters, a correction is calculated for each limiter, this correction being based on an error that is dependent, respectively, on the difference between the predetermined voltage limit of the cell and the actual voltage of the cell and on the difference between the predetermined network voltage limit and the actual onboard network voltage, to which correction a value that is dependent on the integral current terms of the two voltage limiters is added.

Advantageously, the correction based on the error of the cell voltage limiter is, for a given cell, calculated on the basis of the difference between the predetermined voltage limit of the cell and the actual voltage of the cell divided by the resistance of the cell and the correction based on the error of the onboard network voltage limiter is calculated on the basis of the difference between the predetermined network voltage limit and the actual onboard network voltage divided by the resistance of the battery.

Advantageously, the value that is dependent on the integral current terms of the two voltage limiters is the minimum integral current term out of the two integral current terms of the two voltage limiters. This makes it possible to meet the requirements of both limiters and to determine a current limit that is consistent with what is required for the cells of the traction battery and the onboard network.

Advantageously, to the correction based on the error for each of the two voltage limiters, a value that is dependent on the integral current terms of the two voltage limiters is added so as to give a revised integral correction.

Advantageously, the revised integral correction is limited, in a saturation block, between two, minimum and maximum, current values, the values of the revised integral correction that are lower than the minimum value or higher than the maximum value not being taken into account and being replaced, respectively, with the minimum value or the maximum value so as to give a limited revised integral correction, the limited revised integrl correction giving, respectively, the current limit for each of the two limiters.

Advantageously, an auxiliary correction, different from the correction based on the error, is carried out, the possibly limited, if required, revised integral correction and the auxiliary correction being added to obtain the respective current limit for each of the two voltage limiters.

Advantageously, a first voltage limiter first executes the $n^{th}$ loop, the first voltage limiter using the integral current terms of the two voltage limiters taken for the $n-1^{th}$ preceding loop, the second limiter using the integral current term from the $n-1^{th}$ preceding loop as its integral term and the integral term of the $n^{th}$ loop from the first voltage limiter.

Advantageously, the common current for the two voltage limiters is the minimum value for the loop n out of the cell current limit for the traction battery and the current limit for the onboard network.

An aspect of the invention also relates to a control assembly including a cell voltage limiter for a traction battery and a voltage limiter for an onboard network in an electric or hybrid motor vehicle, each voltage limiter imposing a battery current limit and including means for implementing, in a corrector, a feedback loop that is based on the respective error between a voltage limit and an actual voltage so as to determine a respective integral current term for each of the two limiters, noteworthy in that the assembly implements such a determining method and comprises means for transmitting the integral current terms of the cell voltage limiter to the means for implementing the feedback loop of the network voltage limiter and means for transmitting the integral terms of the network voltage limiter to the means for implementing the feedback loop of the cell voltage limiter.

The assembly comprises, for each of the two limiters, a comparison module determining a minimum integral term out of the integral current term associated with the cell voltage limiter and the integral current term associated with the onboard network limiter and a summation module for adding the integral term from the integral corrector of the limiter to said minimum value determined by the comparison module, and a saturation block limiting a revised integral correction from the summation module between two, minimum and maximum, values.

Lastly, an aspect of the invention relates to an electric or hybrid motor vehicle, noteworthy in that it comprises such a control assembly including a cell voltage limiter for a traction battery and a voltage limiter for an onboard network.

BRIEF DESCRIPTION OF THE DRAWINGS

Further features, aims and advantages of aspects of the present invention will become apparent from reading the following detailed description and with reference to the appended drawings, which are given by way of nonlimiting examples and in which.

DETAILED DESCRIPTION OF THE PREFERRED EMBODIMENTS

With reference to all of these figures, an aspect of the present invention relates to a method for determining a cell current limit Lim I C for a traction battery 1 and for an onboard network Lim I RB that is supplied with power by the traction battery 1 in an electric or hybrid motor vehicle, via a control assembly comprising, respectively, a cell voltage limiter and an onboard network voltage limiter. This is shown in FIGS. 3 to 5 for an $n^{th}$ loop, in which the n or n−1 in brackets refers to the loop preceding the $n^{th}$ loop.

Figure 1:
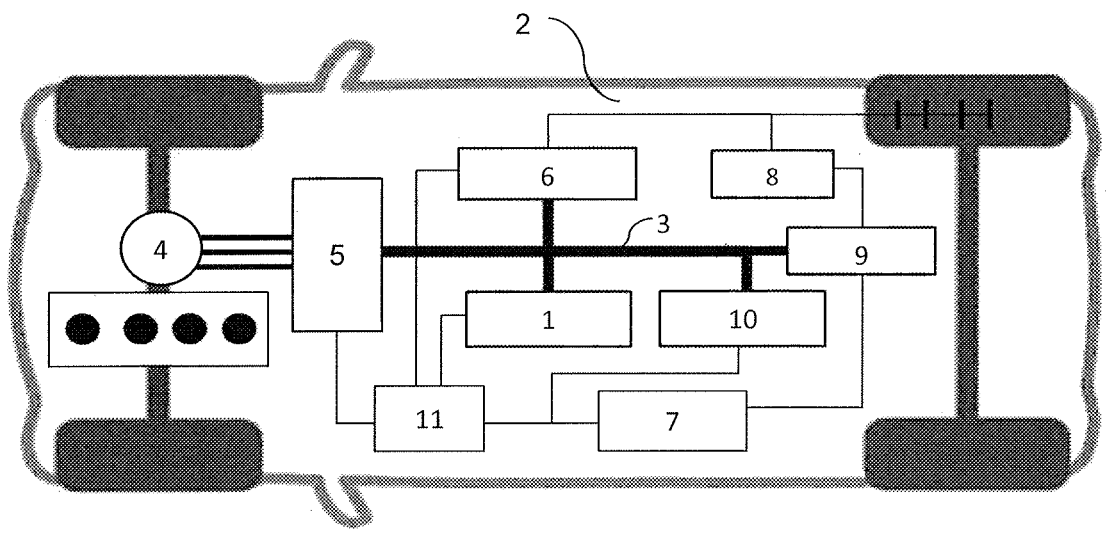
FIG. 1 is a schematic representation of an electric motor vehicle having a traction battery supplying power both to a high-voltage network and to an onboard network in the motor vehicle, the control method according to an aspect of the present invention being able to be implemented in such a motor vehicle.
Figure 2:
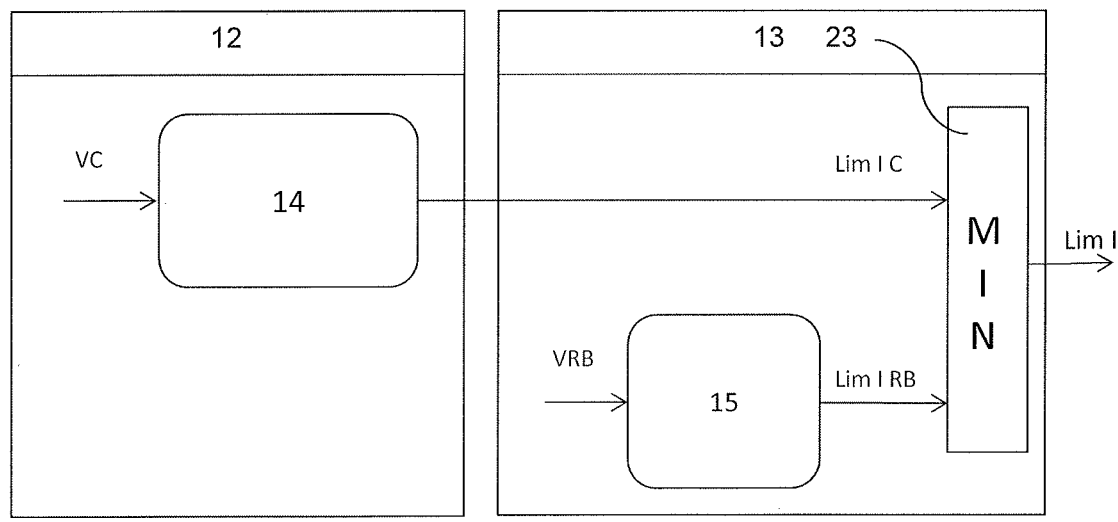
FIG. 2 is a schematic representation of one implementation of a method for determining a battery current limit by comparing a current limit calculated, respectively, by a cell voltage limiter for a traction battery and a voltage limiter for an onboard network in an electric or hybrid motor vehicle, this method being according to the prior art.
Figure 3:
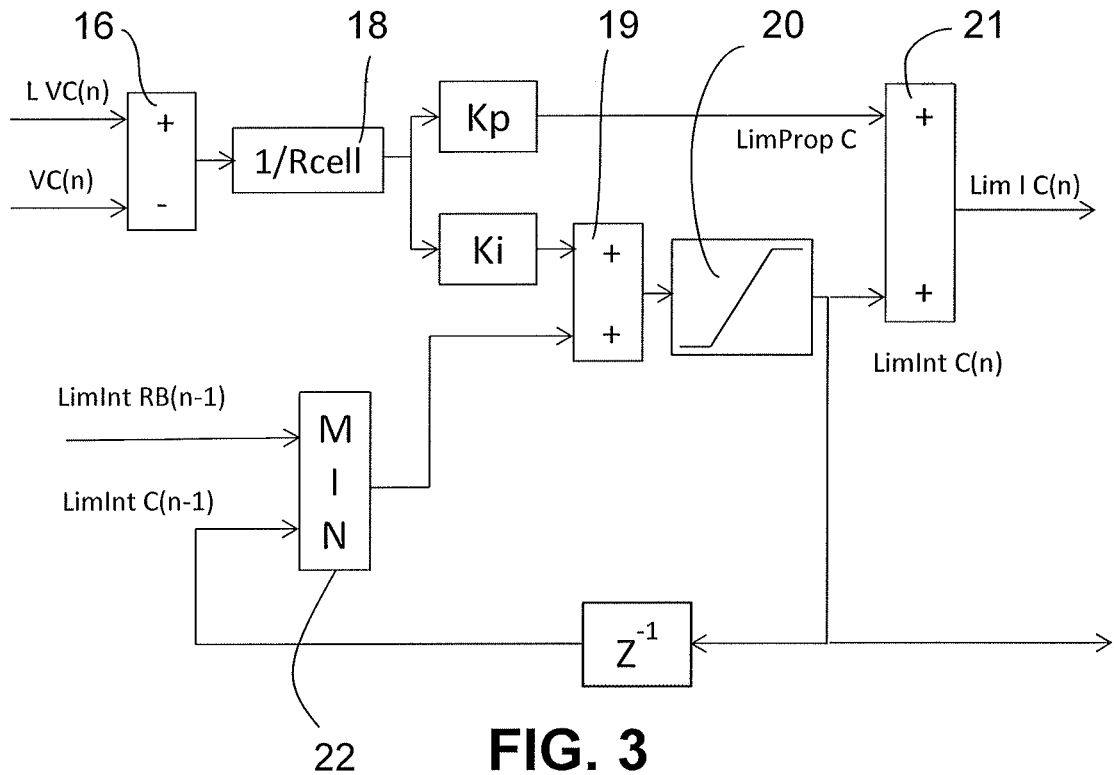
FIG. 3 is a schematic representation of one embodiment of the implementation of a method for determining a battery current limit in a cell voltage limiter for the traction battery in an electric or hybrid motor vehicle for the purpose of determining and imposing a battery current limit, this method being according to an aspect of the present invention, the cell voltage limiter for the battery and the onboard network voltage limiter being interconnected.
Figure 4:
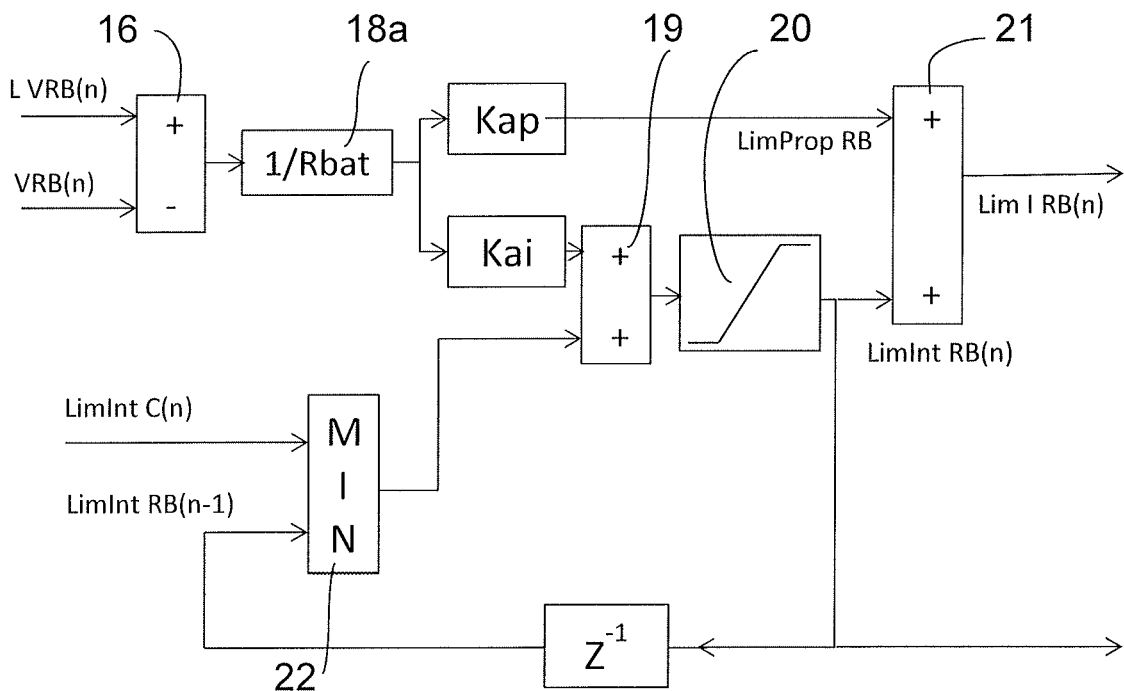
FIG. 4 is a schematic representation of one embodiment of the implementation of a method for determining a battery current limit in a voltage limiter for the onboard network in an electric or hybrid motor vehicle for the purpose of determining and imposing a battery current limit, this method being according to an aspect of the present invention, the cell voltage limiter for the battery and the onboard network voltage limiter being interconnected.
Figure 5:
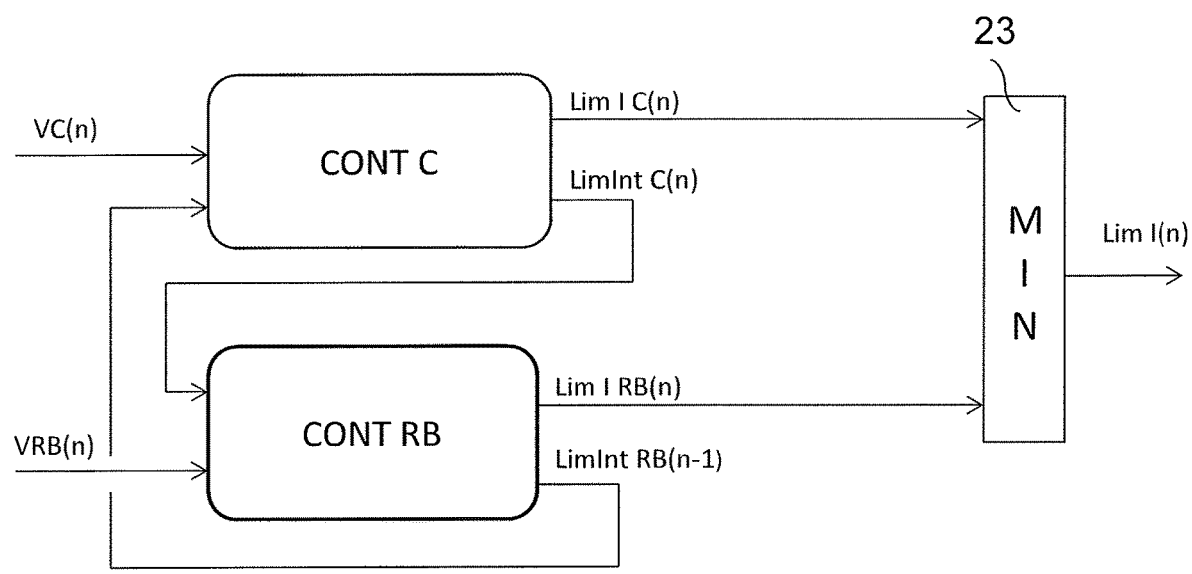
FIG. 5 is a schematic representation of one embodiment of the implementation of the step of determining a common current limit for the battery voltage limiter shown in FIG. 3 and the onboard network voltage limiter shown in FIG. 4, this step being able to be included in a method according to an aspect of the present invention, the minimum value out of the cell current limit and the onboard network current limit then being taken as the common current limit.

FIG. 3 substantially illustrates the control assembly for its portion in charge of controlling the voltage of a traction battery 1 cell, i.e. the cell voltage limiter for the battery that bears the reference CONT C in FIG. 5, and FIG. 4 substantially illustrates the control assembly for its portion in charge of controlling the voltage of the onboard network, i.e. the onboard network voltage limiter that bears the reference CONT RB in FIG. 5. In FIGS. 3 and 4, however, the interconnection between the two voltage limiters can be seen.

With reference to FIG. 3, the cell voltage limiter receives, for each cell, a predetermined cell voltage limit L VC(n) and an actual cell voltage VC(n), the actual cell voltage VC(n) being subtracted from the predetermined cell voltage limit L VC(n) in a subtraction module 16 of the cell voltage limiter, for a feedback loop of order n.

With reference to FIG. 4, still for a feedback loop of order n, the onboard network limiter receives a predetermined network voltage limit L VRB(n) and an actual onboard network voltage VRB(n), the actual onboard network voltage VRB(n) being subtracted from the predetermined onboard network voltage limit L VRB(n) in a subtraction module 16 of the onboard network voltage limiter.

With reference to FIG. 3, a correction based on an error Ki of the cell voltage limiter is, for a given cell, calculated on the basis of the difference between the predetermined cell voltage limit L VC(n) and the actual cell voltage VC(n) divided by the resistance of the cell Rcell in a divider module 18 of the cell voltage limiter.

With reference to FIG. 4, a correction based on an error Kai of the onboard network voltage limiter is calculated on the basis of the difference between the predetermined network voltage limit L VRB(n) and the actual onboard network voltage VRB(n) divided by the resistance of the battery Rbat, which operation is carried out in a divider module 18a of the onboard network voltage limiter.

These two corrections based on an error Kai, Ki form the basis of an integral correction, given that a value dependent on the integral current terms LimInt RB(n−1), LimInt C(n−1); LimInt C(n), LimInt RB(n−1) of the two voltage limiters CONT C, CONT RB is added to them.

Generally, the error related to the correction Ki for the cell voltage limiter is dependent on the difference between the predetermined cell voltage limit L VC(n) and the actual cell voltage VC(n). The error related to the correction Kai for the onboard network voltage limiter is dependent on the difference between the predetermined network voltage limit L VRB(n) and the actual onboard network voltage VRB(n).

With reference to FIGS. 3 and 4, respectively, each limiter therefore comprises a respective integral feedback loop performing a correction based on the error Ki, Kai with the calculation of a respective integral current term LimInt C(n−1), LimInt RB(n−1) on the basis of the difference between the voltage limit L VC(n), L VRB(n) and the actual voltage VC(n), VRB(n) that are received by the limiter, advantageously divided by the resistance of the cell Rcell or the resistance of the battery Rbat.

A first voltage limiter, in FIG. 3, the cell voltage limiter bearing the reference CONT C in FIG. 5, but the converse is also possible, carries out the $n^{th}$ loop first. This first voltage limiter uses the integral current terms LimInt RB(n−1), LinnInt C(n−1) of the two voltage limiters taken for the n−1$^{th}$ preceding loop. Conversely, as the second limiter, in FIG. 4, the onboard network voltage limiter, bearing the reference CONT RB in FIG. 5, works after the first limiter, it may use, in addition to its integral current term of the n−1$^{th}$ preceding loop for its integral term LimInt RB(n−1), the integral term of the $n^{th}$ loop LimInt C(n) from the first voltage limiter, which is then available.

According to an aspect of the present invention, with reference to FIGS. 3 to 5, the integral feedback loops of the two voltage limiters CONT C, CONT RB are interdependent, the integral current terms LimInt C(n) of the cell voltage limiter being transmitted to the integral feedback loop of the network voltage limiter and the integral current terms LimInt RB(n−1) of the voltage limiter of the network being transmitted to the integral feedback loop of the cell voltage limiter so as to determine a respective battery current limit Lim I C(n), Lim I RB(n) for each voltage limiter CONT C, CONT RB.

In FIG. 3, an integral term LimInt RB(n−1) of the onboard network voltage limiter is transmitted to the cell voltage limiter and, in FIG. 4, an integral term LimInt C(n) of the cell voltage limiter, working as the first of the two voltage limiters (but this is optional), is transmitted to the onboard network limiter. The integral current terms LimInt RB(n−1), LimInt C(n−1) are for the cell voltage limiter CONT C and the terms LimInt C(n), LimInt RB(n−1) are for the onboard network voltage limiter CONT.

The reference $Z^{-1}$ for the onboard network voltage limiter and for the cell voltage limiter denotes a mathematical operator for the cell voltage limiter and the onboard network voltage limiter.

To determine a battery current limit Lim I C(n), Lim I RB(n) that is specific to each of the two voltage limiters CONT C, CONT RB, a correction based on the error Ki, Kai is calculated for each limiter, to which may be added a value that is dependent on the integral current terms LimInt RB(n−1), LimInt C(n−1); LimInt C(n), LimInt RB(n−1) of the two voltage limiters CONT C, CONT RB. This may be carried out in a respective first summation module 19, which can be seen in FIGS. 3 and 4.

In the preferred embodiment of an aspect of the present invention, the value that is dependent on the integral current terms LimInt RB(n−1), LimInt C(n−1); LimInt C(n), LimInt RB(n−1) of the two voltage limiters CONT C, CONT RB may be the minimum integral current term out of the two integral current terms LimInt RB(n−1), LimInt C(n−1); LimInt C(n), LimInt RB(n−1) of the two voltage limiters CONT C, CONT RB. This may be carried out in a comparison module 22, which may be similar for both voltage limiters CONT C, CONT RB. This minimum value is then added to the correction based on the error Ki, Kai in the first summation module 19 of the battery cell voltage limiter, shown in FIG. 3, or in the first summation module 19 of the onboard network limiter, shown in FIG. 4. A revised integral correction is thus obtained.

At the output of the respective first summation module 19, the correction based on the error Ki, Kai, to which a value that is dependent on the integral current terms LimInt RB(n−1), LimInt C(n−1); LinnInt C(n), LimInt RB(n−1) of the two voltage limiters CONT C, CONT RB has been added to give a revised integral correction, may be limited, in a saturation block 20, between two, minimum and maximum, current values.

The values of the revised integral correction that are lower than the minimum value or higher than the maximum value are then not taken into account and are replaced, respectively, with the minimum value or the maximum value so as to give a revised and limited integral correction, the revised and limited integral correction giving the respective battery current limit Lim I C(n), Lim I RB(n) for each of the two voltage limiters CONT C, CONT RB.

As shown in FIGS. 3 and 4, an auxiliary correction Kp, Kap, different from the correction based on the error Ki, Kai being used as the basis for an integral correction, may be carried out; in these figures a proportional correction Kp or Kap. In this case, the integral correction that is revised in the first summation module 19 by adding a value that is dependent on the integral current terms LimInt RB(n−1), LimInt C(n−1); LimInt C(n), LimInt RB(n−1) of the two voltage limiters CONT C, CONT RB, which may be limited, if required, and the auxiliary correction Kp, Kap are added to one another to obtain the battery current limit Lim I C(n), Lim I RB(n) for a respective voltage limiter CONT C, CONT RB, which takes place in a second summation module 21.

As can be seen in FIG. 3, in the cell voltage limiter, what is thus obtained, for the loop n, is a cell integral current limit LimInt C(n) obtained by the advantageously revised integral correction and a current limit LimProp C obtained by proportional correction, the possible sum of the two limits giving the cell current limit Lim I C(n). It is also possible for the cell integral current limit LimInt C(n) to give the cell current limit Lim I C(n) directly without further correction.

As can be seen in FIG. 4, in the onboard network voltage limiter, what is thus obtained, for the loop n, is an onboard network integral current limit LimInt RB(n) obtained by the advantageously revised integral correction and a current limit LimProp RB obtained by proportional correction, the possible sum of the two limits giving the cell current limit Lim I RB(n). It is also possible for the onboard network integral current limit LimInt RB(n) to give the onboard network current limit Lim I RB(n) directly.

FIG. 5 shows the combination of a cell voltage limiter CONT C shown in FIG. 3 with an onboard network voltage limiter CONT RB shown in FIG. 4 for calculating a common current limit for the two limiters.

Depending on the cell voltage in the loop n VC(n), the cell voltage limiter CONT C gives a cell current limit Lim I C(n) and an integral cell current limit LimInt C(n).

Depending on the onboard network voltage in the loop n VRB(n), the onboard network voltage limiter CONT RB gives an onboard network current limit Lim I RB(n) and an integral cell current limit LimInt RB(n−1).

To calculate a common current limit Lim I(n) for the two voltage limiters CONT C and CONT RB, this common current limit Lim I(n) is the minimum value for the loop n out of the cell current limit Lim I C(n) for the traction battery and the current limit for the onboard network Lim I RB(n). This is carried out in a comparator MIN bearing the reference 23 in FIG. 5.

With reference to all of these figures, an aspect of the invention also relates to a control assembly including a cell voltage limiter for a traction battery 1 and a voltage limiter for an onboard network in an electric or hybrid motor vehicle fitted with a traction battery 1.

Each voltage limiter imposes a battery current limit Lim I C, Lim I RB and includes means for implementing, in an integral corrector, a feedback loop for determining a respective integral current term LimInt RB(n−1), LimInt C(n−1); LimInt C(n), LimInt RB(n−1) for each of the two limiters CONT C, CONT RB. These implementation means give, respectively, the correction based on the error Ki or Kai by being placed at the output of a respective subtraction module 16 and of a respective divider module 18, 18*a*, which are mentioned above, for the cell voltage limiter or the onboard network voltage limiter.

According to an aspect of the present invention, to implement the determining method such as described above, the assembly comprises means for transmitting the integral current terms LimInt C(n) from the cell voltage limiter to the means for implementing the feedback loop for the onboard network voltage limiter and means for transmitting the integral terms LimInt RB(n−1) from the onboard network voltage limiter to the means for implementing the feedback loop for the cell voltage limiter.

In one preferred embodiment of an aspect of the present invention, the control assembly may comprise, for each of the two limiters CONT C, CONT RB, a comparison module 22 for determining a minimum integral term out of, for the cell voltage limiter, the integral current term LimInt C(n−1) associated with the cell voltage limiter and the integral current term LimInt RB(n−1) associated with the onboard network limiter and, for the onboard network voltage limiter, the integral current term LimInt RB(n−1) associated with the onboard network limiter and the integral current term LimInt C(n) associated with the cell voltage limiter.

Since it is assumed that the cell voltage limiter executes the loop first out of the two limiters, for this cell voltage limiter, the comparison module 22 compares, in FIG. 3, the respective integral terms LimInt RB(n−1) and Lim C(n−1). Conversely, since the onboard network voltage limiter executes the loop second, for this voltage limiter, the comparison module 22 compares, in FIG. 4, the respective integral terms LimInt RB(n−1) and LimInt C(n), this last integral term already being available due to the completion of the loop n by the cell voltage limiter.

Each voltage limiter may comprise a summation module 19 for adding the integral term from the integral corrector of the limiter to said minimum value determined by the comparison module 22 so as to obtain a revised integral correction. Moreover, each voltage limiter may comprise a saturation block 20 limiting the revised integral correction from the summation module 19 between two, minimum and maximum, values.

The assembly for calculating a common current limit Lim I(n) for the two limiters and comprising the two voltage limiters CONT C, CONT RB, this assembly being shown in FIG. 5, may comprise a comparator 23 for determining the minimum value out of the cell current limit Lim I C(n) and the onboard network current limit Lim I RB(n) so as to calculate the common current limit Lim I(n) for the two voltage limiters CONT C, CONT RB.

Lastly, an aspect of the invention relates to an electric or hybrid motor vehicle, noteworthy in that it comprises such a control assembly including a cell voltage limiter for a traction battery 1 and a voltage limiter for an onboard network.

The invention claimed is:

1. A method for determining a common battery current limit on the basis of a cell current limit for a traction battery and for an onboard network that is supplied with power by the traction battery in an electric or hybrid motor vehicle with, respectively, a cell voltage limiter and an onboard network voltage limiter, the cell voltage limiter receiving, for each cell, a predetermined cell voltage limit and an actual cell voltage and the onboard network limiter receiving a predetermined network voltage limit and an actual onboard network voltage, each limiter comprising a respective integral feedback loop calculating, for a loop n being the $n^{th}$ loop, a respective integral current term on the basis of the difference between the voltage limit and the actual voltage that are received by the limiter, wherein the integral feedback loops of the two voltage limiters are interdependent, the integral current terms of the cell voltage limiter being transmitted to the integral feedback loop of the voltage limiter of the network and the integral terms of the voltage limiter of the network being transmitted to the integral feedback loop of the cell voltage limiter so as to determine a common current limit common to the two voltage limiters.

2. The method as claimed in claim 1, wherein, to determine a current limit for each of the two voltage limiters, a correction is calculated for each limiter, this correction being based on an error that is dependent, respectively, on the difference between the predetermined voltage limit of the cell and the actual voltage of the cell and on the difference between the predetermined network voltage limit and the actual onboard network voltage, to which correction a value that is dependent on the integral current terms of the two voltage limiters is added.

3. The method as claimed in claim 2, wherein the correction based on the error of the cell voltage limiter is, for a given cell, calculated on the basis of the difference between the predetermined voltage limit of the cell and the actual voltage of the cell divided by the resistance of the cell and the correction based on the error of the onboard network voltage limiter is calculated on the basis of the difference between the predetermined network voltage limit and the actual onboard network voltage divided by the resistance of the battery.

4. The method as claimed in claim 1, wherein the value that is dependent on the integral current terms of the two voltage limiters is the minimum integral current term out of the two integral current terms of the two voltage limiters.

5. The method as claimed in claim 4, wherein, to the correction based on the error for each of the two voltage limiters, a value that is dependent on the integral current terms of the two voltage limiters is added so as to give a revised integral correction.

6. The method as claimed in claim 5, wherein the revised integral correction is limited, in a saturation block, between two, minimum and maximum, current values, the values of the revised integral correction that are lower than the minimum value or higher than the maximum value not being taken into account and being replaced, respectively, with the minimum value or the maximum value so as to give a limited revised integral correction, the limited revised integral correction giving, respectively, the current limit for each of the two limiters.

7. The method as claimed in claim 6, wherein an auxiliary correction, different from the correction based on the error, is carried out, the possibly limited, if required, revised integral correction and the auxiliary correction being added to obtain the battery current limit for each of the two voltage limiters.

8. The method as claimed in claim 3, wherein a first voltage limiter first executes the $n^{th}$ loop, the first voltage limiter using the integral current terms of the two voltage limiters taken for the n−1$^{th}$ preceding loop, the second limiter using the integral current term from the n−1$^{th}$ preceding loop as its integral term and the integral term of the $n^{th}$ loop from the first voltage limiter.

9. The method as claimed in claim 1, wherein the common current limit for the two voltage limiters is the minimum value for the loop n out of the cell current limit for the traction battery and the current limit for the onboard network.

10. A control assembly including a cell voltage limiter for a traction battery and a voltage limiter for an onboard network in an electric or hybrid motor vehicle, each voltage limiter imposing a current limit and including means for implementing, in a corrector, a feedback loop that is based on the respective error between a voltage limit and an actual voltage so as to determine a respective integral current term for each of the two limiters wherein the assembly implements a determining method as claimed in claim 1 and comprises means for transmitting the integral current terms of the cell voltage limiter to the means for implementing the feedback loop of the network voltage limiter and means for transmitting the integral terms of the network voltage limiter to the means for implementing the feedback loop of the cell voltage limiter.

11. The assembly as claimed in claim 10, comprising, for each of the two limiters, a comparison module determining a minimum integral term out of the integral current term associated with the cell voltage limiter and the integral current term associated with the onboard network limiter and a summation module for adding the integral term from the integral corrector of the limiter to said minimum integral term determined by the comparison module, a saturation block limiting a revised integral correction from the summation module between two, minimum and maximum, values.

12. The method as claimed in claim 2, wherein, to the correction based on the error for each of the two voltage limiters, a value that is dependent on the integral current terms of the two voltage limiters is added so as to give a revised integral correction.

13. The method as claimed in claim 3, wherein, to the correction based on the error for each of the two voltage limiters, a value that is dependent on the integral current terms of the two voltage limiters is added so as to give a revised integral correction.

14. The method as claimed in claim 5, wherein an auxiliary correction, different from the correction based on the error, is carried out, the possibly limited, if required, revised integral correction and the auxiliary correction being added to obtain the battery current limit for each of the two voltage limiters.

\* \* \* \* \*